June 11, 1963  A. B. JACOBSEN  3,093,798
CODED DATA DECODER
Original Filed Sept. 19, 1945
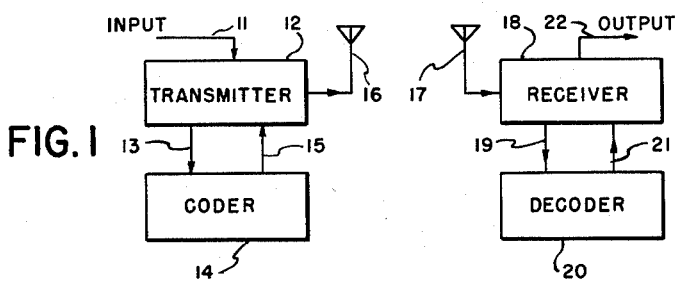
FIG. 1
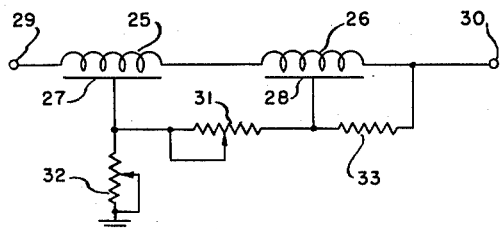
FIG. 2
FIG. 3
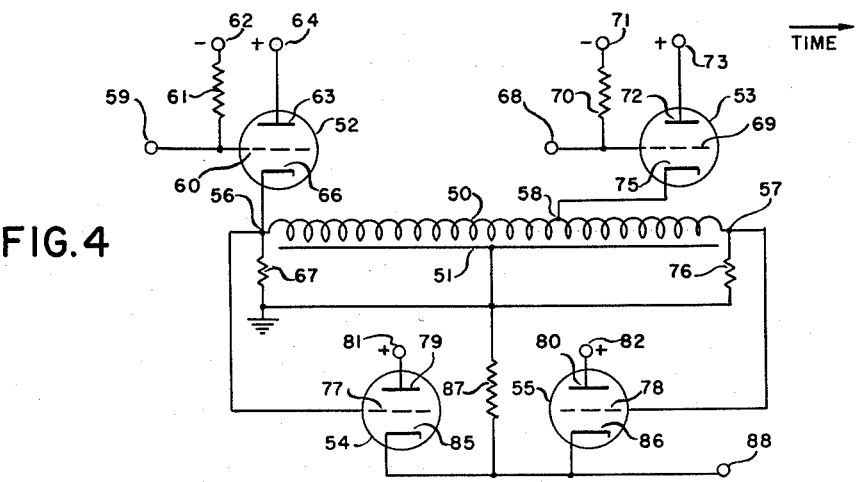
FIG. 4
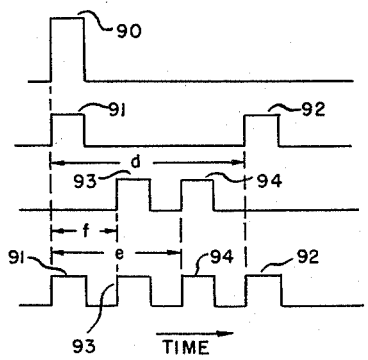
FIG. 5
Inventor
Andrew B. Jacobsen
Attorneys

3,093,798
CODED DATA DECODER
Andrew B. Jacobsen, Somerville, Mass., assignor, by mesne assignments, to the United States of America as represented by the Secretary of the Navy
Original application Sept. 19, 1945, Ser. No. 617,365, now Patent No. 2,772,399, dated Nov. 27, 1956. Divided and this application Feb. 10, 1954, Ser. No. 410,744
8 Claims. (Cl. 328—67)

This invention relates to coding apparatus and is a division of my copending application, Serial No. 617,365, filed September 19, 1945 for a coded data transmission system and more particularly to a transmission system, now U.S. Patent No. 2,772,399 of November 27, 1956 employing a coder for coding a pulse of electrical energy into a plurality of code pulses with predetermined time spacings.

Electromagnetic energy pulse transmission is now well-known to the art; numerous radiant energy echo ranging devices employ it as a basic principle of their operation. Recent developments in this field have included such radiant energy echo ranging devices carried aboard an aircraft, the information received by the aircraft from these devices being conveyed by supplementary relaying means to a ship or land station in order to increase the detection range of a ship or land station. Such a pulsed echo ranging device and relaying system is described more fully in patent application Serial Number 592,794, for a "Synchronizer for Indicators" filed May 9, 1945 by Stanley N. Van Voorhis, now U.S. Patent No. 2,698,931 of January 4, 1955. In relaying such pulsed information it is important that military security be preserved and also that there be no confusion as a result of interference from a spurious source, such as atmospheric noise or other echo ranging systems.

Accordingly, it is one object of this invention to provide a means for relaying and receiving information carried in the form of electromagnetic energy which will preclude the possibility of confusion caused by interference from spurious sources.

Another object is to provide means for relaying and receiving information carried in the form of electromagnetic energy which will insure military security of this information.

A further object is to provide a means for coding a pulse of electrical energy into a plurality of code pulses with predetermined time spacings, transmitting these code pulses in the form of electromagnetic energy, and receiving and converting them back into one pulse of electrical energy.

Still another object is to provide a means for coding a pulse of electrical energy into a plurality of code pulses with predetermined time spacings.

Other and further objects will appear in the course of the following description when taken with the accompanying drawings in which:

FIG. 1 illustrates in block form a system embodying this invention;

FIG. 2 illustrates one embodiment of this invention;

FIG. 3 shows the pulse waveforms associated with FIG. 2, plotted as a function of time;

FIG. 4 illustrates an alternative embodiment of this invention; and,

FIG. 5 shows the pulse waveforms associated with FIG. 4, plotted as a function of time.

In FIG. 1 any desired information in the form of single pulses of electrical energy is fed into input 11 of a conventional pulse transmitter 12, whose construction and design are well-known to those skilled in the art and hence need not be given here. At any convenient point in transmitter 12 is connected input 13 of coder 14, which will be more fully described hereafter in this specification. The purpose of this coder is to code each pulse received at its input into a plurality or series of code pulses separated by predetermined time spacings. Output 15 of coder 14 then feeds these code pulses into transmitter 12, and after further amplification and modulation these code pulses are radiated into space in the form of electromagnetic energy by transmitting antenna 16. These same code pulses are then picked up by receiving antenna 17 and fed into a conventional pulse receiver 18, whose construction and design are well-known to those skilled in the art and hence need not be given here. Input 19 of decoder 20 is connected at any convenient point in receiver 18. The purpose of the decoder is to decode the series of code pulses into a single pulse which then gives the original information or data fed into input 11 of transmitter 12. Such decoders are described in copending application, Serial Number 617,151, filed September 18, 1945, now U.S. Patent No. 2,706,810 issued April 19, 1955 for a "Coded Data Decoder." Decoder output 21 is then fed back into receiver 18 for further amplification of this single pulse and the aforementioned original data is ultimately available at receiver output 22.

In FIG. 2 a coder is shown which comprises two sections of delay line 25 and 26, connected in series. Open end 29 of delay line 25 will be designated as the input and open end 30 of delay line 26 and will be designated as the output. Physically, each delay line is composed of a thin inductive coil surrounded by a cylindrical outer conductor which is represented in FIG. 2 by straight lines 27 and 28 under the coil symbols. Variable resistor 31 is connected between outer conductors 27 and 28, variable resistor 32 is connected between outer conductor 27 and ground, and resistor 33 is connected between outer conductor 28 and output 30. Any pulse applied at input 29 will then be delayed a specified period of time determined by the construction of delay lines 25 and 26 before appearing at output 30.

For purposes of illustration assume that a single pulse of one microsecond duration is applied to input 29. This pulse, which is represented by waveform 40 in FIG. 3, is instantaneously capacity coupled to outer conductor 27, producing a voltage drop across variable resistor 32 and simultaneously appearing at output 30, since variable resistor 31 and resistor 33 form an undelayed conducting path. This initial pulse produced at output 30 is represented by waveform 41, which is of lesser magnitude than waveform 40 due to the voltage drop in the resistors. Assuming that delay line 25 produces a delay of "a" microseconds, "a" microseconds later the original pulse enters the input end of delay line 26 and similarly is capacity coupled to its outer conductor 28, producing a voltage drop across variable resistors 31 and 32, and instantly appears at output 30, as represented by waveform 42. Again, waveform 42 is of lesser magnitude than waveform 40 due to the voltage drop in the resistors and also the attenuation introduced by delay line 25. Assuming that delay line 26 introduces a delay of "b" microseconds, "b" microseconds later the original pulse reaches output 30, as represented by waveform 43, whose decreased magnitude is due to the attenuation of delay lines 25 and 26. By the proper choice of relative impedance values for resistor 33 and variable resistors 31 and 32, waveforms 41, 42, and 43 and their corresponding pulses can be and preferably are in operation made equal in magnitude, though of course smaller than waveform 40 and the corresponding original pulse. The impedance of resistor 33 is made equal in magnitude to the characteristic impedance of delay line 26 and the maximum impedance of resistor 31 is made from one-fourth to one-half this characteristic impedance. Further, resistors 31 and 32 are made variable to facilitate the proper adjustment of the magnitudes of waveforms 41, 42, and 43 and their corresponding pulses. Therefore, the final result is that in place of the original pulse there is now a series of three pulses: the initial pulse followed by its delayed image "a" microseconds later, which in turn is followed by its delayed image "b" microseconds later. The total time delay introduced by delay lines 25 and 26 in series is "c" microseconds, where "a" plus "b" equals "c."

In FIG. 4 is shown an alternative coder which includes a delay line 50 of construction similar to that described above, its outer conductor being represented by straight line 51. This embodiment employs four vacuum tubes 52, 53, 54, and 55 of the conventional triode type, each having a grid, plate, and cathode. Cathode heaters and heater circuits, being well-known to those skilled in the art, are omitted here for the sake of simplification of the diagram. All these tubes are used as cathode followers, and the points at which they are connected to delay line 50 are determined by the coding desired. Tubes 52 and 53 are used as input tubes and tubes 54 and 55 as output tubes. In this embodiment for the coding hereafter described tubes 52 and 54 are connected to input 56 of delay line 50, tube 55 is connected to output 57 of delay line 50, and tube 53 is connected to some intermediate tap or point 58 on delay line 50. A pulse input 59 is connected to grid 60 of tube 52, and to this same grid is connected one end of grid resistor 61. To the other end of grid resistor 61 is connected a suitable source of negative bias voltage at terminal 62. Plate 63 is connected to a source of plate voltage at terminal 64 and cathode 66 is connected to input 56 of delay line 50 and to one end of a resistor 67, whose other end is connected to ground and whose ohmic value is equal to the characteristic impedance of delay line 50. A second pulse input 68 is connected to grid 69 of tube 53 and to one end of grid resistor 70, whose other end is connected to a suitable source of negative bias voltage at terminal 71. Plate 72 is connected to a source of plate voltage at terminal 73 and cathode 75 is connected to point 58 on delay line 50 as previously mentioned. Outer conductor 51 of delay line 50 is grounded as is one end of resistor 76, whose other end is connected to output 57 and whose ohmic value is equal to the characteristic impedance of delay line 50. Input 56 is connected to grid 77 of tube 54 and output 57 is connected to grid 78 of tube 55. Plates 79 and 80 are connected to suitable sources of plate voltage at terminals 81 and 82 respectively and cathodes 85 and 86 are connected together and to one end of cathode resistor 87, whose other end is grounded. This common cathode junction point also serves as output 88 of the coder circuit.

Referring now to FIG. 5 also, assume first that a single pulse of one microsecond duration is applied to input 59 of tube 52. This original applied pulse is represented by waveform 90. Due to the circuit previously described, this pulse will instantaneously appear at output 88, although reduced in magnitude due to the cathode follower action of tubes 52 and 54 in the circuit. This initial pulse at output 88 is represented by waveform 91. Assuming that delay line 50 introduces a delay of "d" microseconds, "d" microseconds later a second pulse will pass through tube 55 and appear at output 88, as represented by waveform 92. The magnitude of this pulse will also be less than that of the original applied pulse due to the cathode follower action of tubes 52 and 55 and the attenuation of delay line 50. Thus a single pulse has been coded into two pulses delayed one from the other by a predetermined spacing "d."

Next assume that the original pulse is applied not to input 59, but instead to input 68, and that delay line 50 introduces a delay of "e" microseconds between points 56 and 58 and "f" microseconds between points 57 and 58. From this it is also apparent that "e" plus "f" equals "d." Tracing through the circuit, an original pulse applied to input 68 and again represented by waveform 90 would result in a pulse delayed "f" microseconds at output 88, as represented by waveform 93, and a pulse delayed "e" microseconds at output 88, as represented by waveform 94. Again the magnitudes of these waveforms 93 and 94 and their corresponding pulses are less than that of the original pulse and its waveform 90 due to the cathode follower action of tubes 53 and 55 and the attenuation introduced by delay line 50 between points 57 and 58 and the cathode follower action of tubes 53 and 54 and the attenuation introduced by delay line 50 between points 56 and 58 respectively.

Finally, if the same original pulse represented by waveform 90 is applied to inputs 59 and 68 simultaneously the resultant at output 88 will be as shown in the bottom line of waveforms in FIG. 5, including waveforms 91, 93, 94, and 92, spaced as shown.

Thus it is obvious that this second embodiment provides a very flexible coding means, since by providing various taps on delay line 50 and varying the inputs to the various input tubes and the connections from the input and output tubes to these various taps a multiplicity of codes may be simply and easily obtained. Also, of course, additional similar input and output tubes can be added to obtain an even greater variety of codes.

It is to be understood that while the operation of the above embodiments of this invention has been described with reference to a single input pulse, the embodiments are operable with a plurality of successive pulses. Further, while specific embodiments have been described as required by the Patent Statutes, the principles of this invention are of much broader scope. Numerous additional specific applications, as, for example, employing multivibrators, will occur to those skilled in the art and no attempt has been made to exhaust such possibilities. The scope of the invention is defined in the following claims.

What is claimed is:

1. In a transmission system, a coder comprising a delay line, a resistor connected between one end of said delay line and ground, a second resistor connected between the other end of said delay line and ground, each of said resistors having an impedance equal to the characteristic impedance of said delay line, a cathode follower circuit including a triode vacuum tube on whose grid may be impressed a pulse input and whose cathode is connected to one end of said delay line, a second cathode follower circuit including a triode vacuum tube whose grid is connected to the same end of said delay line, a third cathode follower circuit including a triode vacuum tube whose grid is connected to the other end of said delay line, a common cathode resistor connected between ground and the cathodes of said vacuum tubes included in said second and third cathode follower circuits, said cathodes being connected together and also to the output terminal of the coder, and a fourth cathode follower circuit including a triode vacuum tube on whose grid may also be impressed a pulse input and whose cathode is connected to any desired tap on said delay line.

2. Apparatus for producing predetermined sequential time-spaced output pulses for each input pulse comprising, a delay line having input taps spaced asymetrically with respect to its transverse axis of electrical symmetry, the ends of said delay line being terminated by resistors, each of said terminating resistors having an ohmic value equal to the characteristic impedance of said delay line, a pair of electron tubes, a resistor common to the cathodes of said electron tubes, the input circuit of each of said electron tubes being coupled across a different one of said terminating resistors, and means for taking the output across the said common resistor.

3. Apparatus for producing a train of time spaced output pulses from an input pulse comprising, in combination, a delay line, said delay line terminating at each end in its characteristic impedance, means for applying an input pulse simultaneously to two spaced points along said delay line, said points being asymmetrically spaced with respect to the transverse axis of electrical symmetry of said delay line and means for combining the pulses appearing across said characteristic impedances thereby to produce a train of time spaced output pulses.

4. In a system as defined in claim 3 wherein one of said spaced points is located at one end of said delay line whereby one of the pulses in the train coincides in time with said input pulse.

5. In a system as defined in claim 3 wherein said means for applying said input pulse includes a first pair of cathode follower stages, one of said stages having as its cathode load resistor one of said characteristic impedances.

6. In a system as defined in claim 3 wherein said means for applying said input pulse includes a first pair of cathode follower stages, one of which stages has as its cathode load resistor one of said characteristic impedances and the other of which has as its cathode load resistor a portion of said delay line and the other of said characteristic impedances.

7. In a system as defined in claim 6 wherein said means for combining said pulses appearing across both of said characteristic impedances includes a second pair of cathode follower stages, said stages having their input circuits connected to different ones of said characteristic impedances and a single resistor serving as the cathode load resistor for said second pair of cathode followers whereby said train of time spaced output pulses occurs across said single resistor.

8. A wave signal coder for translating each signal pulse into a predetermined number of time spaced output pulses comprising, a delay line having first and second asymmetrically spaced input taps, a terminating resistor at each end of said delay line, each resistor having a magnitude equal to the characteristic impedance of said delay line, means for applying an input pulse simultaneously to both of said spaced input taps, means for combining the pulses appearing across said terminating resistors, said combining means including a pair of electron tubes having a common cathode resistor and each end of said delay line being coupled to the control grid of a different one of said electron tubes.

References Cited in the file of this patent
UNITED STATES PATENTS

| | | |
|---|---|---|
| 2,265,996 | Blumblein | Dec. 16, 1941 |
| 2,289,500 | James | July 14, 1942 |
| 2,415,359 | Loughlin | Feb. 4, 1947 |